United States Patent [19]

Haynes

[11] 4,373,500
[45] Feb. 15, 1983

[54] CARBURETOR AIR INJECTION SYSTEM

[76] Inventor: Louis E. Haynes, 302 S. 6th, Union City, Tenn. 38261

[21] Appl. No.: 305,791

[22] Filed: Sep. 25, 1981

[51] Int. Cl.³ .............................................. F02M 23/04
[52] U.S. Cl. .................................. 123/587; 48/180 A
[58] Field of Search ............................ 123/585–589; 48/180 A

[56] References Cited

U.S. PATENT DOCUMENTS

| | | | |
|---|---|---|---|
| 1,118,865 | 11/1914 | Johnston et al. | 48/180 A |
| 2,078,481 | 4/1937 | Chanavier | 123/586 |
| 2,518,082 | 8/1950 | Shively | 123/587 X |
| 3,156,226 | 11/1964 | Linn | 123/585 |
| 3,494,341 | 2/1970 | Serruys | 123/587 |
| 3,564,580 | 2/1971 | Cinque | 123/585 |
| 3,834,367 | 9/1974 | Dalerta | 123/447 |
| 3,943,900 | 3/1976 | Primrose | 123/587 |
| 4,160,433 | 7/1979 | Olson | 123/587 |

FOREIGN PATENT DOCUMENTS 143514 9/1951 Australia .
834369 11/1938 France .

*Primary Examiner*—William A. Cuchlinski, Jr.

[57] ABSTRACT

A carburetor air injection system comprising a downdraft carburetor which includes a butterfly type automatic choke valve, a butterfly type throttle valve spaced from said automatic choke valve, an idler jet in the carburetor on the opposite side of the throttle valve from the automatic choke valve, and a fuel jet between the automatic choke valve and the throttle valve. An air injector plate is positioned between the carburetor and the intake manifold. The air injection plate includes capillary air orifices feeding constantly controlled quantities of air into the air-fuel mixture passing from the carburetor to the intake manifold during operation of the engine. A flexible tubing having an air filter removably associated therewith is connected to the air injector plate.

1 Claim, 5 Drawing Figures

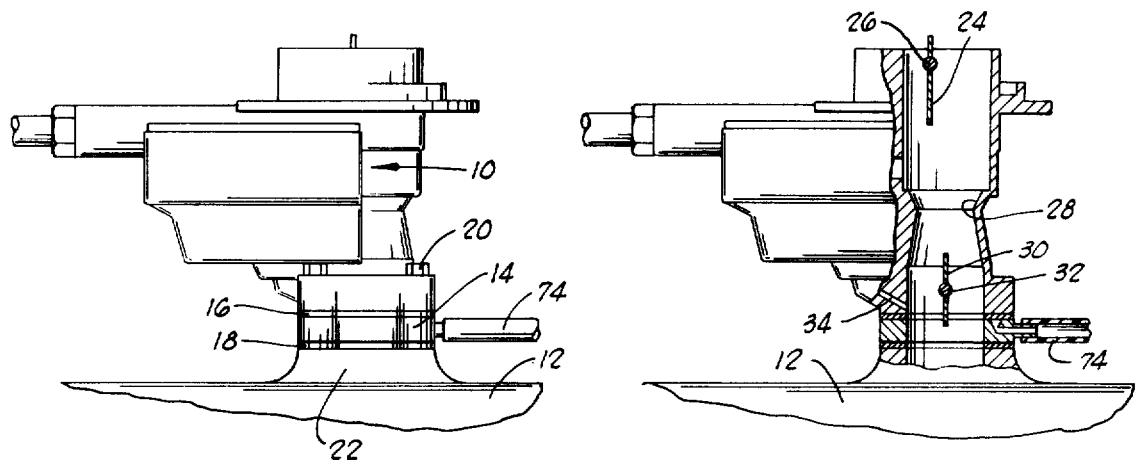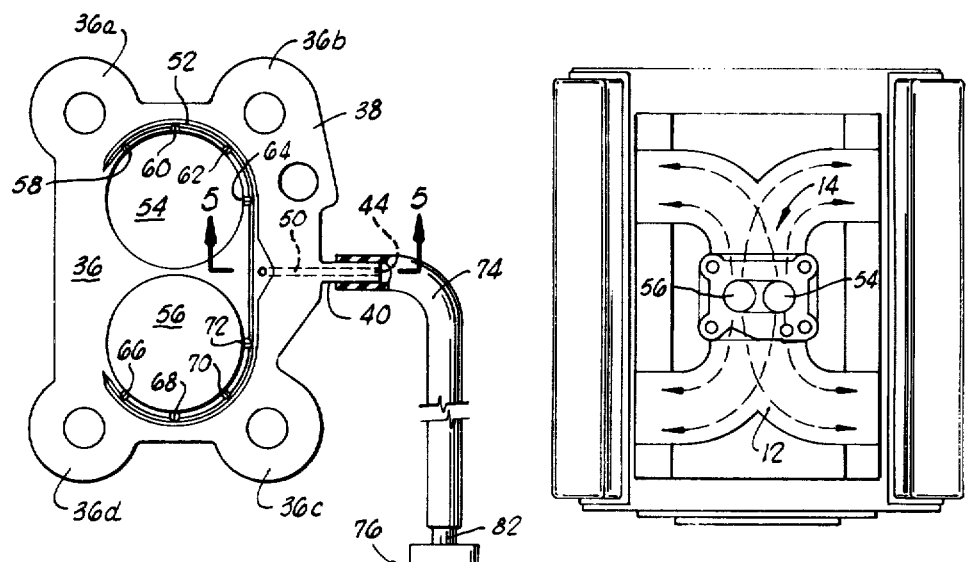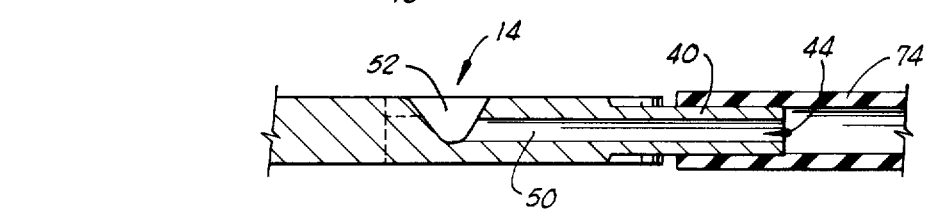

CARBURETOR AIR INJECTION SYSTEM

BACKGROUND OF THE INVENTION

1. Field of the Invention

This invention relates to improvements in internal combustion engines, and more particularly, to improvements in the carburetor system used for charging a combustible fuel mixture to said engine.

2. Brief Description of the Prior Art

Numerous efforts have been made to improve the efficiency of gasoline fueled internal combustion engines by providing some type of auxiliary air source from which air, in addition to that normally mixed with the fuel by the conventional carburetor, is provided at certain times during operation of the engine. In general, these systems have undertaken to selectively alter the leanness or richness of the combustible gasoline-air mixture at times when the speed of operation of the engine is such that the mixture provided by the carburetor is relatively inefficiently consumed by the engine. It has also usually been a part of the proposal for realizing improved efficiency to provide a valve operatively connected to the accelerator or throttle of the engine, which valve regulates the amount of auxiliary air introduced to the normal fuel-air mixture from the carburetor in correspondence to the degree to which the accelerator is depressed or the throttle opened.

Since gasoline-fueled internal combustion engines have been used to automobiles for powering such vehicles, a wide variety of types of valved air admission systems have been proposed for attachment between the various types of carburetors used down through the years, and the engine intake manifold for providing controlled quantities of supplementary or auxiliary air to the regular fuel-air mixture developed by the carburetor and charged to the intake manifold. An early patent directed to a system of this type was U.S. Pat. No. 1,102,053 to Johnson. In the Johnson structure, hot air was drawn across the exhaust manifold of the engine, and was admitted in selectively controlled quantities through a valve provided between the updraft carburetor and the intake manifold. The valve was manipulated by a hand lever mounted on the steering column of the vehicle so as to control the quantity of hot air admitted through small holes provided adjacent the passageway from the carburetor to the intake manifold. The object of this system was stated to be to break up globules of liquid gasoline passed by the carburetor to the manifold.

Russell U.S. Pat. No. 1,177,831 proposed to provide a horizontally extending spring loaded valve in a position between the carburetor and the engine. The Russell valve admitted variable amounts of auxiliary air in correspondence to the speed of engine operation (that is, the valve was opened to a variable degree in dependence upon the particular speed at which the engine was operated). Russell alleged that this arrangement provided more economical mixtures of fuel.

In Guthrie U.S. Pat. No. 1,201,457, an auxiliary air valve was provided between the updraft carburetor and the intake manifold of the engine for admitting variable and selectively controlled quantities of air to the intake manifold. The air valve thus provided was connected, and operated in correlation to, the spark advance lever used to control the speed of operation of the engine. Here again, the stated object was to provide more efficient fuel mixtures when the engine was operated under heavy loads.

A slightly later patent was U.S. Pat. No. 1,421,135 to Alton. In the Alton system, auxiliary air was admitted to the intake manifold connected to an updraft carburetor. The Alton system included two valves, one operating in response to the variable vacuum developed by the engine during operation, and the other responding to the momentum of fuel passing through the intake manifold to in turn control the force applied to the first valve by the acting vacuum. Alton claimed that this automatic control, governed by these two parameters to which the two valves responded, made the valve more responsive to engine needs in terms of optimum fuel mixture under varying operating conditions. Interestingly, Alton stated that satisfactory results cannot be realized if the suction in the manifold alone is relied upon to control the amount of auxiliary air admitted to the intake manifold. As will be subsequently shown in continuing the review of prior art in this area, this was also the observation arrived at by a very recent patentee of a system of this general type.

In Fisher U.S. Pat. No. 1,516,282, a suction or vacuum operated check valve was provided in an updraft carburetor to admit air at variable quantities and rates to the intake manifold, with this patentee again claiming to achieve greater economy in the use of fuel. Fisher apparently, in contrast to Alton, concluded that the response of the air admitting valve to vacuum created by the operation of the engine was alone sufficient to provide the auxiliary air necessary to improved operation of the engine.

Stepp U.S. Pat. No. 1,761,692 proposed to admit auxiliary air through a large number of apertures between an updraft carburetor and an intake manifold of the internal combustion engine. Again, rather than simply permitting the valve to respond in its opening and closing to vacuum developed by the engine during use, Stepp proposed to open and close the valve in direct response to movement of the engine throttle.

In U.S. Pat. No. 2,078,481 to Chanavier, a linkage was provided between the accelerator pedal and a valve positioned in a conduit for the purpose of providing auxiliary air to the fuel system. Thus, as the accelerator pedal of the engine was depressed, the amount of air introduced to a location between a downdraft carburetor of the two barrel type and an intake manifold would be varied accordingly. According to the patentee, a substantial saving in fuel consumption was realized with this system. Of the same general type of system—that is, supplemental or auxiliary air admitting valves being connected to, and responsive to, accelerator actuation—were the systems shown in Bashford et al. U.S. Pat. No. 2,100,466 and Roberts U.S. Pat. No. 2,884,954.

A recent attempt to improve on the seemingly agreed upon, less than optimum efficiency of carburetion achieved by factory-made carburetors, from the standpoint of overall engine operation and efficiency, is embodied in Cinque U.S. Pat. No. 3,564,580. The Cinque patent is a more complicated system and, in conformity with the concerns of the times, alleges that the system provided not merely improves the efficiency of engine operation and the economy of fuel consumption, but also reduces the pollution attributable to the combustion products from such engines. It is, as previously pointed out, interesting to note that Cinque, in agreement with the statement many years earlier by Alton, as set forth in U.S. Pat. No. 1,421,135, concluded that supplying auxiliary air, purely in response to the vacuum developed by the engine during operation, was not an adequate answer to the proper control of auxiliary air admitted to the carbureted fuel as it passed to the intake manifold.

To meet the need to provide a response different from a pure vacuum actuated response, Cinque provided conduits or passageways for continuously admitting air to a point of introduction to the fuel mixture between the carburetor and the inlet manifold, with these conduits being open and providing air at all times during all phases of operation of the engine. He then further provided another source of auxiliary air which would be responsive to the vacuum developed in the intake manifold during operation of the engine, such control device being a spring loaded check valve which responded to such vacuum. In actuality, both Cinque and Alton provide systems which, in the final analysis, admit variable quantities of air as the engine is varied in its operation, although, as both claim, such variable quantities of air are not directly and purely dependent upon the development of vacuum during engine operation, and transmitted to the involved valve structures via the intake manifold.

I have proposed a system which includes an air valve which is connected by a control linkage to the accelerator of an automobile, and which is actuated in response to the actuation of the accelerator for varying the opening through the air valve to admit supplemental air to a distribution manifold, or air admission ring, positioned between the carburetor and the intake manifold. I have determined now, after considerable usage of that system, that though it effects some improvement in the efficiency of operation of an internal combustion engine used in conjunction with the system, the employment of an air valve of the type there described in response to the actuation of an automobile accelerator actually is a less desirable system than a different specific system which I have found to be highly efficient in use, and to afford a further improvement in the operation of internal combustion engines. My improved system does not employ an air valve actuated from the throttle, nor does it indeed employ any valve, but relies instead upon a constant, highly specifically dimensioned air passageway which admits air in a certain specific pattern to the flow of the fuel-air mixture from a carburetor to the intake manifold of an internal combustion engine.

BRIEF DESCRIPTION OF THE PRESENT INVENTION

Broadly described, the carburetor air injection system of the present invention comprises a downdraft carburetor of the type which includes a butterfly type automatic choke valve, a butterfly type throttle valve spaced downwardly in the carburetor from the automatic choke valve, an idler jet in the carburetor on the opposite side of the throttle valve from the automatic choke valve, and a fuel jet between the automatic choke valve and the throttle valve. An air injector plate is positioned between the carburetor and the intake manifold. The air injector plate includes capillary air orifices feeding constantly controlled quantities of air, admitted through a constant diameter inlet orifice, into the air-fuel mixture passing from the carburetor to the intake manifold during operation of the engine. Connected to the inlet orifice is a flexible tubing and air filter apparatus for filtering the air flowing into the inlet orifice.

More specifically, the inlet orifice provided in the present invention has a diameter which is between 3/64ths inch and 6/64ths inch, with the optimum size for this orifice being between 1/16th inch and 5/64ths inch, in dependence upon whether the carburetor in use is a one barrel carburetor or a two or four barrel carburetor. The invention further is directed to and includes, the method of operating the internal combustion engine with the carburetor air injection system described, in which the total vacuum normally pulled by the operating engine through the intake manifold is reduced by 40% of the normal value of the vacuum.

The air injector plate employed in the invention is preferably of an aluminum construction, and about ⅜ inch in thickness, and functions to insulate the carburetor from engine heat transmitted by conduction through the intake manifold.

An arcuate manifold orifice through which air is admitted to radial capillary air orifices provided in a central portion of the air injector plate is connected to an elongated inlet orifice. The arcuate manifold orifice feeds a plurality of radial orifices positioned over about 180° of the periphery of a circular opening through the air injector plate, through which opening, the fuel-air mixture from the carburetor is fed to the intake manifold.

An important object of the present invention is to provide an air injection system for use in conjunction with internal combustion engine carburetors, which system admits a controlled quantity of auxiliary air to the fuel-air mixture developed in the carburetor, and by such admission of a controlled quantity of auxiliary air, greatly increases the efficiency with which the engine may be operated when utilizing gasoline as a fuel.

An additional object of the present invention is to provide an air injection system which is interposed, in part, between the carburetor and an air injection manifold in a fashion which insulates the carburetor from the intake manifold in a way which reduces undesirable heating of the carburetor and which, by such heating, reduces the efficiency with which fuel is atomized and carbureted before combustion in the engine.

Another object of the present invention is to produce an air injection system which includes an air injector plate having a removable and quickly replaceable filter connected thereto for efficiently filtering air charged to the air injector plate, and from such plate admitted to the fuel-air mixture passing from the carburetor to the intake manifold.

Another object of the invention is to achieve more efficient and complete burning of the gasoline fuel employed in an internal combustion engine so that air polluting products of combustion are reduced, and the fuel is consumed more efficiently.

An additional object of the invention is to provide an auxiliary air injection system which reduces the vacuum developed in the carburetor by an operating internal combustion engine, and by such vacuum reduction improves the efficiency with which the engine is operated.

A further object of the invention is to provide an air injection system for admitting predetermined quantities of auxiliary air to the fuel-air mixture passed from a carburetor to a gasoline powered internal combustion engine, with such auxiliary air being admitted at times when the engine is idling so as to greatly improve the efficiency with which the engine may be idled, and to reduce the amount of gasoline consumed during idling.

A further object of the invention is to provide an air injection system for admitting auxiliary air to the stream of a vaporous fuel-air mixture passing from a conventional internal engine carburetor into the intake manifold thereof, with the auxiliary air being admitted in such a way, during operation of the engine with the automatic choke valve of the carburetor closed, that less gasoline is consumed and the engine is operated more efficiently during such time of automatic choking.

Additional objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 1 is a side elevation view of a carburetor and intake manifold of an internal combustion engine as they are employed in conjunction with the air injection system of the present invention.

FIG. 2 is a vertical sectional view taken through the center of the carburetor and the air injection system of the present invention illustrating portions of both in section, and also illustrating portions of the carburetor and an automobile internal intake manifold in elevation.

FIG. 3 is a bottom plan view of an air injector plate forming a portion of the air injection system of the present invention, and showing the plate as it appears when viewed from below.

FIG. 4 is a top plan view of an internal combustion engine showing the arrangement thereon of the carburetor and the intake manifold for purposes of depicting the manner in which the intake manifold distributes air to the cylinders of the engine, and is arranged in relation to the air injection system of the present invention.

FIG. 5 is a sectional view taken along line 5—5 of FIG. 3.

DETAILED DESCRIPTION OF THE PREFERRED EMBODIMENT OF THE INVENTION

Referring initially to FIG. 1 of the drawings, shown therein is a carburetor air injection system constructed in accordance with the present invention as the same appears as it is used in combination with a downdraft carburetor and the intake manifold of an internal combustion engine. The downdraft carburetor employed as a portion of the system is designated generally by reference numeral 10 and the engine intake manifold is designated generally by reference numeral 12. Positioned between the barrels of the carburetor and the intake manifold 12 is an air injector plate 14 constructed in accordance with the present invention. Disposed on opposite sides of the air injection plate are a pair of heat resistant gaskets 16 and 18 which may be made of a suitable material, such as asbestos, or more preferably, tar paper. The latter material of construction advantageously affords a self-sealing function. A plurality of bolts 20 are employed for extension through the base of the carburetor, through holes formed in the gaskets and air injection plate 14, and into a built-up head 22 formed on the intake manifold 12.

The carburetor 10 shown in use is illustrated in section in FIG. 2. The carburetor is a two-barrel carburetor, and one of the barrels is shown in FIG. 2. Positioned in the upper portion of each barrel is a butterfly type automatic choke valve 24 which is mounted for pivotation about a horizontal axis on a shaft 26 according to conventional construction. The carburetor contains a Venturi throat 28 below the automatic choke valve 24, and in the lowermost portion of each carburetor barrel a throttle valve 30 of the butterfly type is mounted for pivotation about a horizontal axis upon a shaft 32. A small idling jet orifice 34 is provided in the side of the carburetor barrel below the throttle valve 30 for introducing a minute jet of a combustible fuel, such as gasoline, at such time as the engine is idling.

As shown in FIGS. 2 and 3, the air injector plate 14 positioned between the carburetor 10 and the intake manifold 12 is a relatively thin metallic plate 36 which is of generally rectangular configuration and has a plurality of apertured ears 36a, 36b, 36c and 36d formed at the opposite corners thereof. The plate is referably made of aluminum and includes a portion 38 formed along one side edge thereof. The portion 38 has a stem 40 extending therefrom, but integrally formed therewith. Formed through the stem 40 is an air injection port 44 having a non-varying diameter. This air injection port 44 is relatively small and, for proper performance of the present invention, is between 3/64ths inch and 3/32nds inch in diameter. Preferably, the port 44 is between 1/16th inch and 5/64ths inch in diameter, dependent upon whether the carburetor in use is a one-barrel carburetor, or a two- or four-barrel carburetor. The 1/16th inch diameter port is optimum for use on a one-barrel carburetor, and the 5/64ths inch port is optimum on two- and four-barrel carburetors.

Extending from the end of the stem 40 which is attached to the edge of the portion 38 is a capillary passageway 50 formed in the portion 38. The capillary passageway 50 terminates in, and communicates with, a curvilinear groove 52 formed in the upper side of the rigid plate 36. The curvilinear groove 52 extends concentrically around the circular outer periphery of a pair of relatively large ports or openings 54 and 56 which are of substantially the same size as the openings at the lower ends of the two barrels of the carburetor 10, so that passage of a fuel-air mixture from the carburetor through the air injector plate 14 to the intake manifold 12 is unimpeded by any constriction at this location. It will be noted in referring to FIG. 3 that substantially equal lengths of the groove 52 lie on opposite sides of the point of intersection of the capillary passageway 50 with the groove 52, so that auxiliary air entering the groove 52 from the capillary passageway 50 is substantially equally distributed to the opposite end portions of the groove.

Projecting radially inwardly from the groove 52 to points of intersection with the circular outer periphery of the ports 54 and 56 are a plurality of feed passageways 58, 60, 62, 64, 66, 68, 70 and 72. It will be noted that the four passageways 58–64 feed auxiliary air radially inwardly into the port 54, and that these passageways are circumferentially spaced around this port and enter it over an arc of about 180° of the port. The same configuration of the passageways 66–72 in relation to the port 56 exists. The purpose of this arrangement of the passageways 58–72 in relation to the ports 54 and 56 will be hereinafter explained in greater detail.

Connected to the stem 40 by suitable means in one end of a flexible tubing 74. Connected to a second end of the tubing 74 is a housing 76 having an air filter 78 removably retained therein by suitable means, such as by a retaining screen. The first and second ends of the tubing 74 are displaced from each other by a distance suitable for making the second end easily accessible when the plate 14 is mounted as described hereinabove.

The housing 76 has a cylinder portion 80 and a neck portion 82 extending from the cylinder 80. The neck portion 82 is frictionally, threadedly, or otherwise suitably engaged with the second end of the tubing 74.

The air filter 78 is made of a substance suitable for filtering the auxiliary air which is introduced into the air inlet port 44 through the flexible tubing 74. The suitability of the air filter substance can be determined by applicable environmental regulations. Because of the easy accessibility and replaceability of the filter 78, the appropriate specific type of filter can readily be used in the present invention to reduce air pollution.

The manner in which the air injector plate 14 is mounted on the intake manifold, and its relation to the remainder of the internal combustion engine is best illustrated in FIG. 4 of the drawings. Referring to this figure of the drawings, it will be perceived that the groove 52 and the passageways 58-72 projecting radially therefrom to the ports 54 and 56 are positioned in relation to these ports so that air is charged from the groove 52 to that side of the ports 54 and 56 which is nearest the intake manifold. It will be seen that air entering the intake manifold via the ports 54 and 56 flows in the general direction of the arrow shown in FIG. 4. Therefore, auxiliary air which is introduced at the points around the circular periphery of the ports 54 and 56 where the passageways 58-72 intersect these ports will be distributed into the air-fuel mixture passing through these ports in a way which affords the most direct charging over the length of the intake manifold to the several cylinders of the engine. Thus, an even distribution of auxiliary air being charged relatively directly to the cylinders of the engine is achieved at all times due to the construction and geometry of the air passageways formed in the air injector plate 14.

Reference has previously been made to the criticality of the size of the port 44 formed in the stem 40. I have determined that on those types of one-barrel to four-barrel carburetors now presently provided on all makes of automobiles, the specified size of the port 44 affords the optimum admission of auxiliary air. The vacuum developed during normal engine operation, as applied to a vacuum gauge connected to the intake manifold, is about 20 psi of vacuum. In providing a port 44 of about 1/16th inch in diameter on one-barrel carburetors, and about 5/64ths inch on carburetors of the two- or four-barrel type, the vacuum developed by the intake manifold is reduced by about 40 percent, or to about 12 pounds.

I have determined that with this reduction in the vacuum developed in the intake manifold, a very significant improvement in the efficiency of operation of the engine is realized. Thus, with leaded gasoline and utilizing a Model Cadillac, the gasoline mileage has consistently been increased from eleven miles per gallon to eighteen miles per gallon. With non-leaded gasoline, the improvement realized has been from eleven miles per gallon to 16.8 miles per gallon. Moreover, the inclusion of the air injector plate forming a portion of the present invention and constructed as described has been found to save approximately half of the gasoline normally consumed during idling of the engine. This is apparently due to the amount of auxiliary air drawn through the air injector plate mixing with the relatively rich charge of gasoline admitted through the idling orifice 34 at this time, so that more efficient consumption of the fuel results. Further, on those occasions when the automatic choke valve 24 is closed for some period of time while the engine becomes sufficiently heated for the automatic choke to open, tests have shown that substantially better and more efficient combustion of the fuel mixture occurs. The more efficient combustion of gasoline at this time also results in earlier opening of the automatic choke due to more rapid heating of the engine. I have also noticed with some automobiles that during operation of the automobile with the automatic choke in the closed position, and without having the air injector plate of the present invention included in the carburetion system, some particles of unburnt liquid fuel can actually be detected in the exhaust of the engine. Incorporation of the air injector plate of the invention in the assembly, however, eliminates this waste of fuel, and no unburned liquid particles are detected when the carburetor air injection system of the present invention is in use.

The provision of the aluminum air injector plate at a location between the downdraft carburetor and the intake manifold has the further advantage of insulating the carburetor from engine heat moving by conduction to the carburetor from the intake manifold. The air circulated through the groove 52 in the air injection plate tends to cool this plate and aid in its insulating function. The lowering of the extent of heat transfer from the engine to the carburetor prevents thermal expansion of the carburetor resulting in undesirable opening of the gasoline feed conduits and jets when the engine becomes highly heated over extended period of operation. This prevention of distortion of the gasoline feed conduits and jets is believed to also aid in the more efficient performance of the engine since the optimum quantity of gasoline continues to be fed from the carburetor to the air intake manifold despite heating of the engine to a high temperature.

The provision of the readily accessible, easily removable and replaceable filter attached to the flexible tubing is also believed to be a significantly advantageous feature of the present invention. Thus, the filter can be easily replaced with whatever frequency is desired in order to assure proper flow of auxiliary air to the ports 54 and 56 and with whatever type of filter is suitable to comply with pertinent environmental regulations. From what has been previously said herein concerning the criticality of the amount of air thus introduced to the fuel-gas mixture passing from the carburetor to the intake manifold, the importance of the replaceability of this filter will be clearly understood.

Finally, the inclusion of tar paper gaskets 16 and 18 allows a self-sealing function to be achieved by such gaskets so that a tight seal is provided between the air injector plate 14 and the carburetor 10 and air intake manifold 12.

I have determined by the placement of a vacuum gauge in communication with the ports 54 and 56 through the air injector plate 14 that by constructing the port 44 of the diametric size described, I obtain a relatively consistent lowering of the vacuum developed by the intake manifold from about 20 psi to about 12 psi during all phases of operation of the engine up to about 60 miles per hour. While the extent of reduction in vacuum will vary some above this speed with most automobiles, the effect of employing the system of the present invention at higher speeds of operation still is advantageous, and a more efficient operation of the engine in terms of gas consumption is found to occur even at these higher speeds.

Although a preferred embodiment of the invention has been herein described, it will be appreciated that some changes in structure can be effected by departure from the basic principles of the invention. Such changes and structural innovations are therefore deemed to be circumscribed by the spirit and scope of the invention except as the same may be necessarily limited by the appended claims or reasonable equivalents thereof.

What is claimed is:

1. A carburetor injection system for reducing the suction developed by an intake manifold and for reducing the amount of heat transferred between an intake manifold and a carburetor, comprising:
    a downdraft carburetor including at least one barrel;
    an internal combustion engine including a plurality of spaced cylinders and an intake manifold communicating with said cylinders for charging a combustible mixture of fuel and air to said cylinders;
    an automatic choke vlave in at least one barrel of said carburetor;
    a flat, substantially rectangular air injector plate sealingly positioned between a carburetor and the intake manifold and including at least two fuel passage ports through the plate, said plate having:
        a single auxiliary air inlet port extending through one edge of said plate and opening internally of said one edge along a part of one side of said plate which is closest to said intake manifold and said auxiliary air inlet port having a diameter between 3/64ths inch and 3/32nds inch, said diameter being non-varying throughout the length of said port;
        air passageway means disposed in said one side of said air injector plate for conveying auxiliary air from said air inlet port to said fuel passage ports, said air passageway means comprising:
            a curvilinear groove having a first semi-circular portion of uniform cross-sectioned configuration extending substantially halfway around a first one of said two fuel passage ports and also having a second semi-circular portion extending substantially halfway around a second one of said two fuel passage ports;
            a capillary passageway connecting said curvilinear groove with said single auxiliary air inlet port so that substantially equal lengths of said curvilinear groove lie on opposite sides of the point of intersection of said capillary passageway with said curvilinear groove to substantially equally distribute to the first and second semi-circular portions air entering said curvilinear groove from said capillary passageway; and
            a plurality of substantially equally spaced auxiliary air feed passageways extending radially inward from each of said semi-circular portions to communicate with the periphery of the respective fuel passage port over about 180° of the periphery of said port so that air is distributed evenly to the cylinders of said engine through said intake manifold;
    a flexible tubing having a first end connected to said single auxiliary air inlet port and having a second end displaced from said first end;
    air filter means, connected to said second end of said tubing, for filtering auxiliary air introduced into said auxiliary air inlet port through said flexible tubing;
    a first tar paper gasket positioned between said one side of said air injector plate and said intake manifold;
    a second tar paper gasket positioned between said air injector plate and said carburetor; and
    a throttle valve positioned in at least one barrel of said carburetor between said automatic choke valve and said air injector plate.

* * * * *